United States Patent [19] | [11] 4,291,458

Flinn | [45] Sep. 29, 1981

[54] APPARATUS AND METHOD FOR INSTALLING WICKING IN CANDLES

[75] Inventor: Robert W. Flinn, Blytheville, Ark.

[73] Assignee: American Greetings Corporation, Cleveland, Ohio

[21] Appl. No.: 929,671

[22] Filed: Jul. 31, 1978

[51] Int. Cl.$^3$ .............................................. B29C 27/30

[52] U.S. Cl. .................................... 29/650; 29/33 R; 29/564.6; 408/71

[58] Field of Search ................. 29/33 R, 564.6, 564.2, 29/650; 425/803, 515, 517; 408/71

[56] References Cited

U.S. PATENT DOCUMENTS

| | | | |
|---|---|---|---|
| 828,176 | 8/1906 | Bailey | 408/71 |
| 1,578,232 | 3/1926 | Ferris | 408/71 X |
| 1,702,229 | 2/1929 | Moulton | 29/33 R |
| 1,721,513 | 7/1929 | Gisolfi et al. | 425/803 |
| 3,907,487 | 9/1975 | Reiher | 29/564.6 X |
| 3,964,858 | 6/1976 | Marik | 425/517 X |

FOREIGN PATENT DOCUMENTS

| | | | |
|---|---|---|---|
| 447609 | 5/1936 | United Kingdom | 425/517 |

*Primary Examiner*—William R. Briggs
*Attorney, Agent, or Firm*—Baldwin, Egan, Walling & Fetzer

[57] ABSTRACT

An apparatus and method for installing wicking in a formed candle body; the apparatus comprising a bore forming station, a clean out station, a feeding station, and conveying means for moving a candle body from one station to the next station in the process of inserting a wick therein. A novel candle product is also disclosed.

18 Claims, 19 Drawing Figures

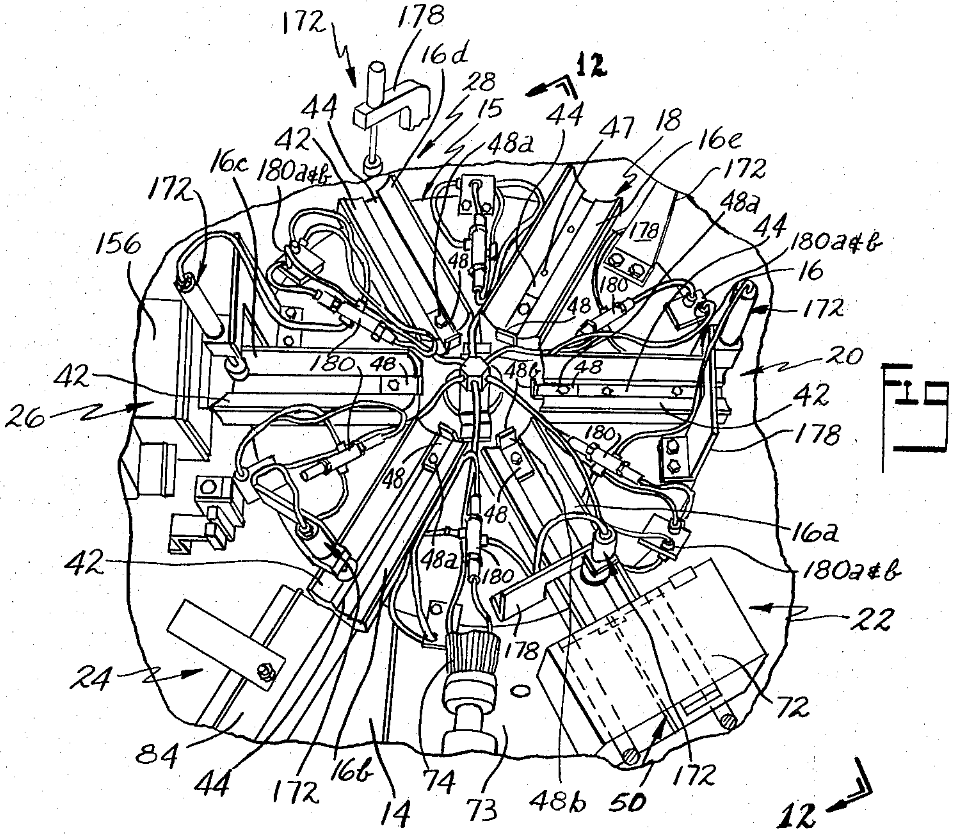
Fig 11
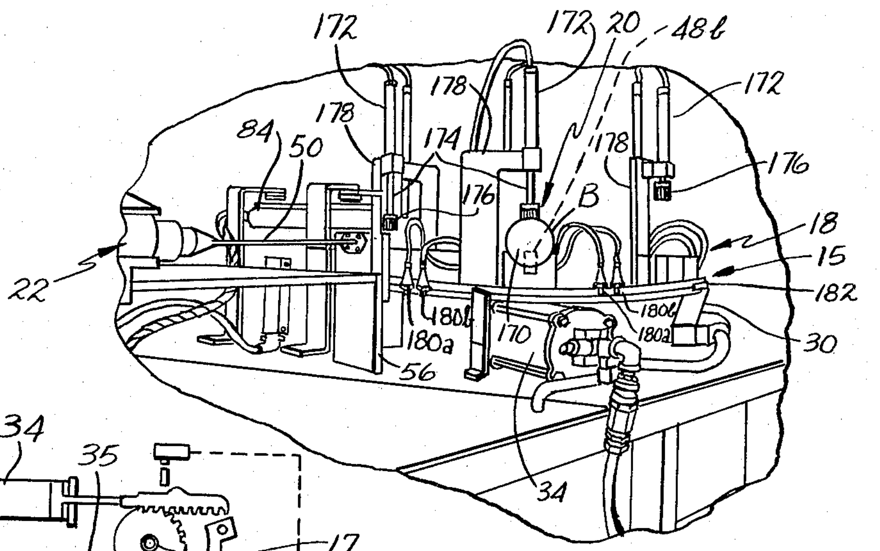
Fig 12
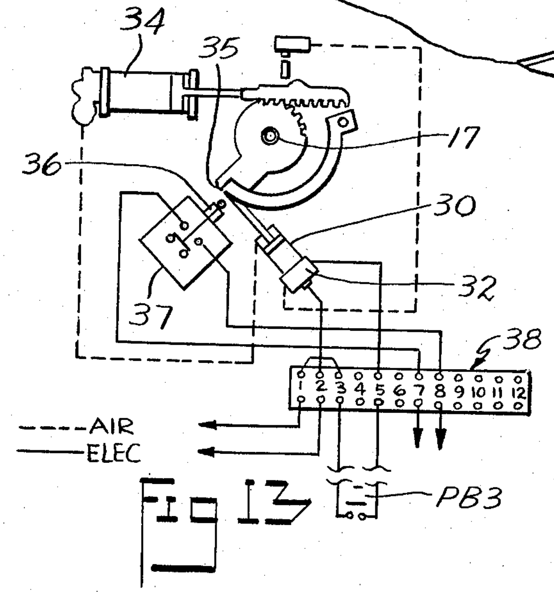
Fig 13
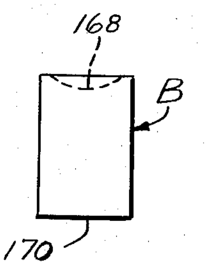
Fig 16
Fig 17
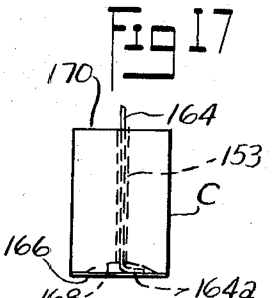
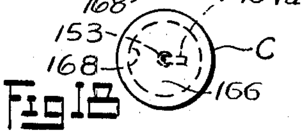
Fig 18

APPARATUS AND METHOD FOR INSTALLING WICKING IN CANDLES

This invention relates in general to the art of candle making and more particularly to an apparatus and method for preparing and inserting wicks in formed candle bodies or blanks, resulting in a novel candle product.

BACKGROUND OF THE INVENTION

It is known in the art to manufacture candles by molding, and wherein a candle body is molded by casting the wax in a mold having a wick inserted therein. Maintaining the wicks centrally in the mold during such operation is a rather difficult procedure, with offset wicking in a candle usually causing uneven burning of the latter.

It is also known in the art to mold a candle body with an opening therein, and then insert a wick therein, such as shown for instance in U.S. Pat. No. 3,907,487. Such prior art mechanisms have generally been unduly large and occupy considerable space, and furthermore do not always operate in a manner resulting in high production of finished candles.

SUMMARY OF THE INVENTION

The present invention provides an improved apparatus and method for preparing and installing wicking in candle bodies and comprising in its preferred arrangement a station for forming a bore or passageway in a formed candle body or blank, a clean out station for cleaning out the bore, and a feeding station for feeding a length of wicking into the formed bore; means are provided for moving or indexing the candle blank from one station sequentially to and from the next station and so on until the wick installing operation is completed, such stations and moving means being arranged in a compact manner for minimum space requirements. A novel candle product is produced.

Accordingly, it is an object of the invention to provide a new and useful apparatus and method for preparing and installing wicking in candles.

Another object of the invention is to provide an apparatus for the above type which is compact in nature occupying minimum space and yet one that has considerable candle output potential.

Another object of the invention is to provide an apparatus and method for installing wicking in formed candles bodies or blanks which includes a bore forming station, a clean out station, a feed station and means automatically moving the candle blanks from one station to the next station until completion of the wicking installation.

Another object of the invention is to provide an arrangement of the latter type which includes means for measuring, and cutting the candle wicking at the feed station.

A further object is to produce a novel candle product.

Other objects and advantages of the invention will be apparent from the following description taken in conjunction with the accompanying drawings wherein:

BRIEF DESCRIPTION OF THE DRAWINGS

FIG. 11 is a top perspective generally detailed view of the apparatus of the invention;

FIG. 12 is a fragmentary side elevational view of the apparatus taken generally along the plane of line 12—12 of FIG. 11 looking in the direction of the arrows;

FIG. 13 is a diagrammatic illustration of the mechanism and controls for indexing the rotary table to control sequential movement of the candle blanks to and from the various stations of the apparatus;

FIG. 16 is a side elevational view of one of the preformed candle blanks, which are adapted for use on the apparatus of the invention;

FIGS. 17 and 18 are respectively side and bottom end plan views of the finished candle product after the introduction of the wicking therein, and application of a paper seal to the concave bottom of the candle product.

DESCRIPTION OF PREFERRED EMBODIMENTS

Figure 1:
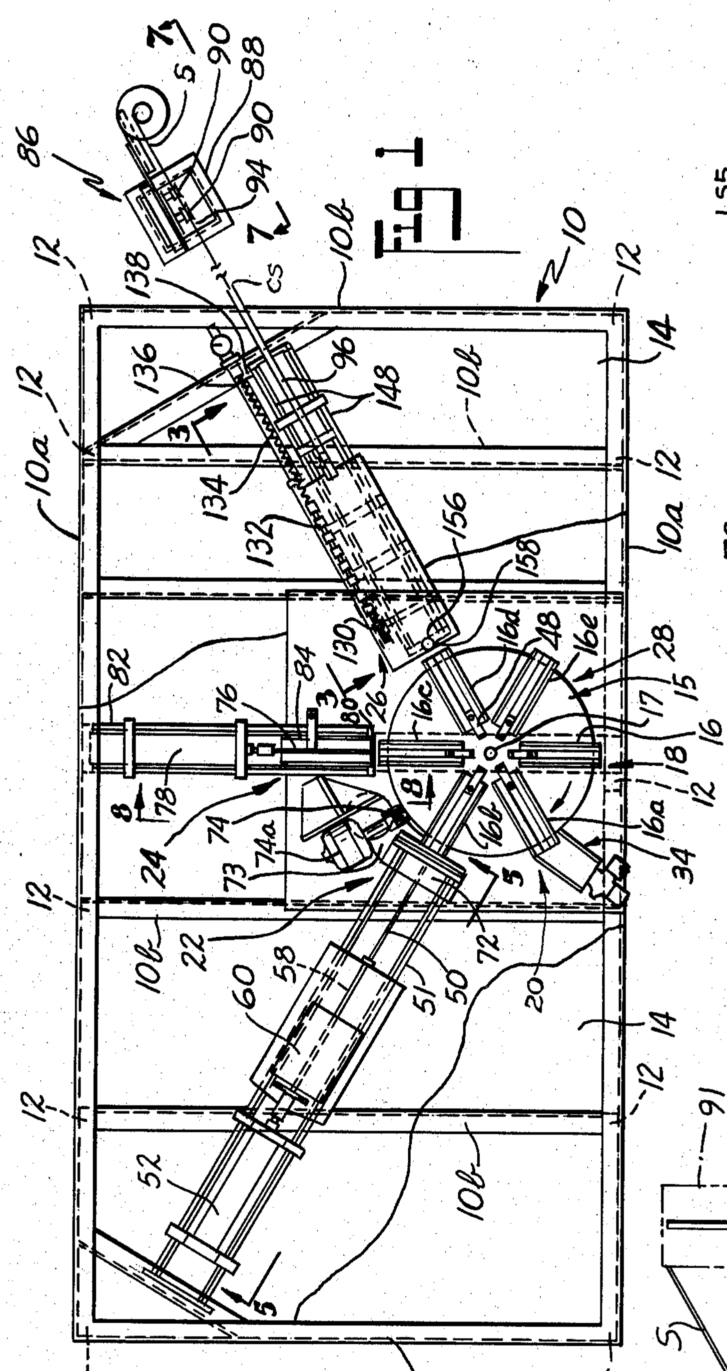
FIG. 1 is a partially broken top plan, generally diagrammatic illustration of the apparatus of the present invention.
Figure 14:
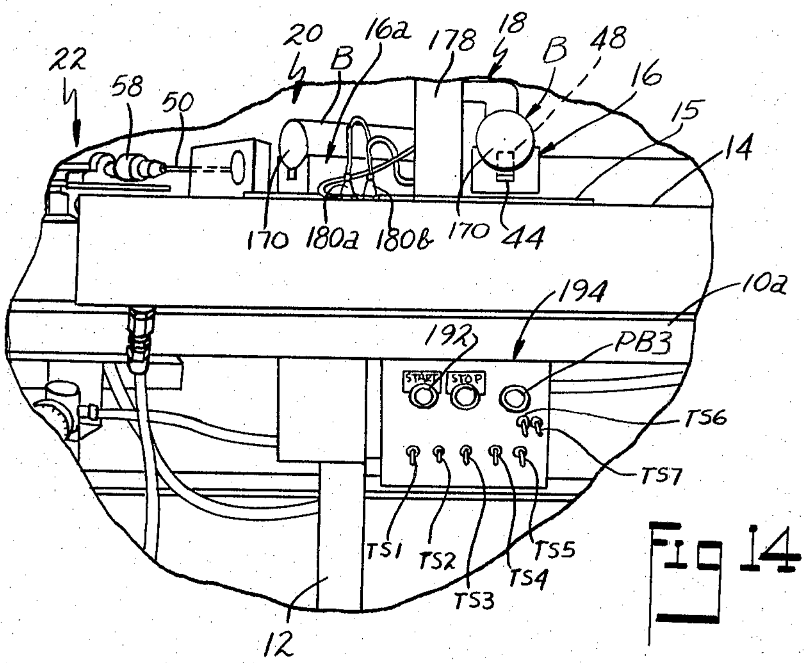
FIG. 14 is an elevational view of the control panel as mounted on the apparatus support, for controlling the automatic operation of the apparatus.

Referring now again to the drawings and particularly to FIG. 1, there is illustrated apparatus of the present invention which is mounted on a frame or support 10, in the form of a table-like structure which may be formed of the structural elements 10*a* and 10*b* illustrated and which may include legs or other-like elevating supports 12 (FIG. 14) which raise the surface 14 of the support structure above ground level and to a level which is convenient for a workman for placing candle bodies or blanks B onto the mechanism. It will be understood of course that if an automatic feeding means is provided for feeding candle blanks to the wick installing apparatus of the present invention, that the level of the support could be at any desired level, the level in the embodiment illustrated being only in the interests of making it convenient for a workman which has the responsibility for loading the mechanism with candle blanks B. Blanks B (FIG. 16) are solid bodies of wax which are preferably cast in molds, and which are then handled by the mechanism of the invention for inserting the wicking therein.

Mounted on frame support 10 is a rotary table 15 disposed in the embodiment illustrated at an elevation above surface 14 and supporting thereon a plurality (in the embodiment illustrated 6) of candle supports 16, 16*a*, 16*b*, 16*c*, 16*d* and 16*e*, each of which forms a cradle for receiving a candle body. Table 12 is adapted to rotate about vertical axis 17, from and to its six positions which includes a loading station 18, an intermediate station 20, a bore forming station 22, a clean out station 24, a wick feeding station 26, and an unloading station 28, disposed at predetermined locations about rotary table 15.

Rotary table 15 is in general a commercially available structure purchasable, for instance from a variety of manufacturers, including The Bellows Belvoir International Corporation of Akron, Ohio. It is adapted to automatically index through the six positions illustrated, and as will be hereinafter discussed in greater detail.

Referring now to FIG. 13, there is schematically illustrated the control circuit for the rotary table 15, which controls the automatic indexing of the table to its six positions. Such control circuit for the table includes an air actuated pawl show cylinder 30, controlled by an electrical solenoid valve 32, which in turn causes actuation of the main, pressurized air cylinder 34, for indexing movement of the table. As the table completes its indexing, it is locked in position and a one way dog 35 automatically trips a plunger 36 which actuates an impulse switch 37, which through terminal 7 and 8 of the index table panel control 38 is used for synchronizing the movement of the rotary table as will be hereinafter discussed. Momentary actuation of start switch PB3 energizes the pawl shoe cylinder control valve 32 through terminals 2 and 5 in panel control 38.

Figure 9:
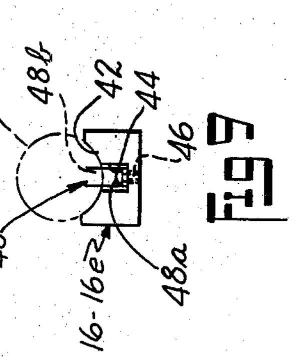
FIG. 9 is an end elevational view of one of the candle support members for holding a candle blank as it is presented at the various stations of the apparatus; a candle blank is shown in phantom on the support.
Figure 15:
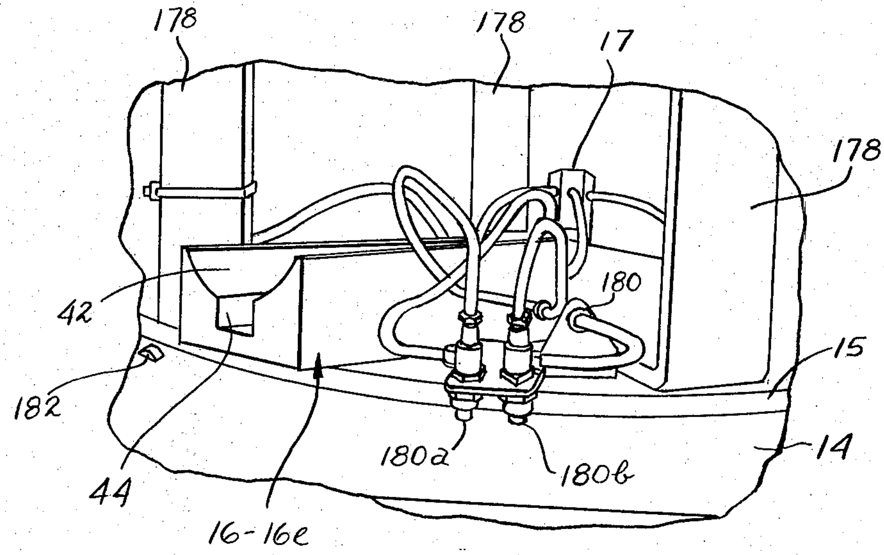
FIG. 15 is a fragmentary elevational view of cam actuated valves for automatically controlling the operation of fluid powered retainer mechanism for holding the candle blanks in position on the supports therefor, during movement of the rotary table to and from the various stations of the apparatus.

Each of the candle supports 16–16*e* can be best seen in FIGS. 9, 11 and 15, comprises an elongated trough-like member or cradle which has a partial generally semi-circular support surface 42 thereon, for supporting the associated candle blank B. Surface 42 has a generally centrally located elongated slot 44 therein with threaded openings 26 being provided in the support communicating with the slot 44. Such support members 16–16*e* are mounted on the table as by threaded fastener means 47 disposed in the respective slot 44 so as to be out of interferring relation with an associated candle body B, supported in the respective support trough.

Removable stop means comprising in the embodiment illustrated, a generally L-shaped member 48, is attached to each of the support troughs, with the stop member being mounted in the slot 44 of the respective trough as by means of a threaded fastener 48*a*, so as to be out of interferring relation with the candle body. The upstanding leg or arm 48*b* of the stop member 48 provides a limiting abutment to the preformed candle body B. Spaced threaded openings in slot 44 provides for moving the stop lengthwise of the slot, thus providing for different lengths of candles. Conventionally, 9, 12 and 14 inch long candles are adapted to be handled by the apparatus of the invention, by selective positioning movement of the abutment stop associated with each support member 16–16*e*.

Figure 6:
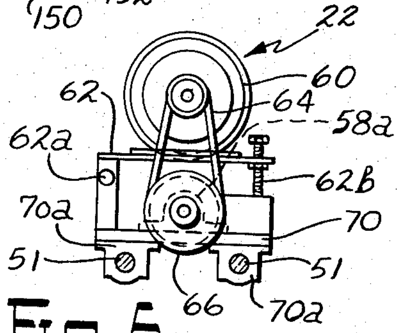
FIG. 6 is a sectional view taken generally along the plane of line 6—6 of FIG. 5 looking in the direction of the arrows.

The bore forming station 22 comprises a power operated drill 50 (FIGS. 4, 5 and 6) mounted on a slide support 51 which is operated by means of a fluid powered, double acting motor unit 52, for moving the rotating drill toward and away from the confronting candle body support member (16–16*e*) for forming a generally axial bore opening in the preformed candle blank B.

The elongated rotatable drill bit of drill 50 at its distal end is guided and extends through an opening in a face plate 56, as at 56*a*, and with the drill body 58 being mounted in bearings 58*a*, for rotation by means of, in the embodiment illustrated, an electric motor unit 60, mounted on a support 62, with the motor being coupled as by means of pulley and belt coupling 64, to a sheave 66, which is attached to the rotary body 58 of the drill, so that upon energization of the motor 60, the sheave 66 is rotated to cause rotation of the drill.

The aforementioned fluid powered motor unit 52 is stationarily mounted as at 67 to the slide supports 51 (FIG. 5) and is coupled as at 68 to the platform support 70 for the drill, which in turn is supported by means of slides 70*a*, on the spaced slide supports or rails 51 for movement of the rotating drill toward and away from the respective confronting candle support 16–16*e* as will be hereinafter described. Motor support 62 may be pivoted as at 62*a*, and provided with a threaded adjustable, stop 62*b*, for providing for selectively adjusting the tension in drive belt 64.

Figure 4:
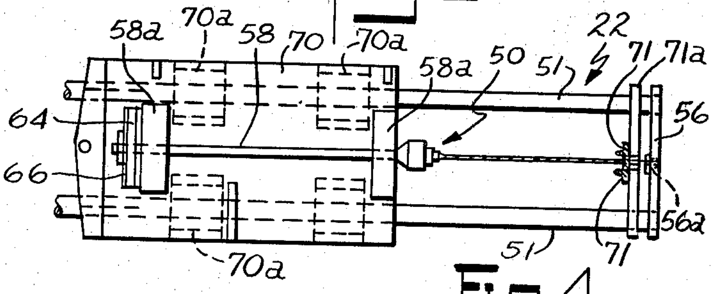
FIG. 4 is a view taken generally along the plane of line 4—4 of FIG. 5 looking in the direction of the arrows, and illustrating a portion of the bore forming station of the apparatus of FIG. 1.
Figure 5:
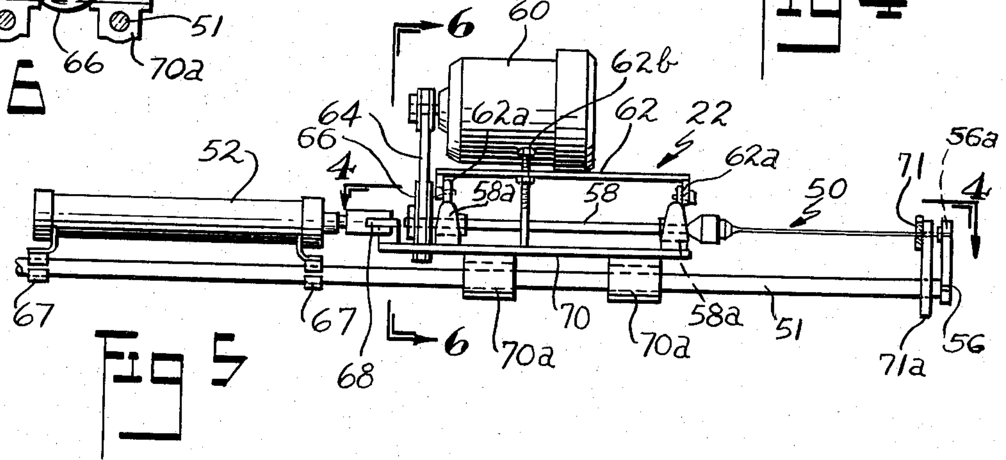
FIG. 5 is an elevational view of the bore forming station of the apparatus taken generally along the plane of line 5—5 of FIG. 1, looking in the direction of the arrows.

Upon extension of the rotating drill by means of reciprocal fluid powered motor unit 52, the drill passes completely through the preformed body of the candle blank supported at the confronting station on the index table 15, to form an axial bore in the blank. The motor unit 52 is automatically retracted as will be hereinafter described, to cause withdrawal of the drill from the candle body, and back to the point wherein the tip end of the drill bit is disposed once more within the opening 56*a* in face plate 56 (FIGS. 4 and 5). During withdrawal of the rotating drill, the latter is preferably cleaned of wax by wire brushes 71 rotatably mounted on a support 71*a*, and engaging the drill bit for cleaning the latter. These rotatable wire brushes are preferably idlers. A housing 72, preferably formed of see-through plastic, may enclose the end of the bore forming station where the drilling occurrs, to restrict the dispersal of the wax chips, the latter preferably falling down into a receiving pan 73 which is preferably electrically heated, for recovery of the wax, by drainage to a collection point beneath the table.

The table 15 then is automatically indexed, passing the confronting end of the bored candle body past the rotating brush 74, which is driven by electrical motor unit 74a (FIGS. 1 and 11) which brushes any wax chips or drilled material adhering to the candle face away from the candle down to the aforementioned heated collection pan. As can be seen from FIG. 1, the candle body supports 16–16e extend out beyond the periphery of the rotary table 15, so that good contact is made by the brush with the candle blank end, the latter being generally co-planar with the corresponding end of the associated support 16–16e.

Figure 8:
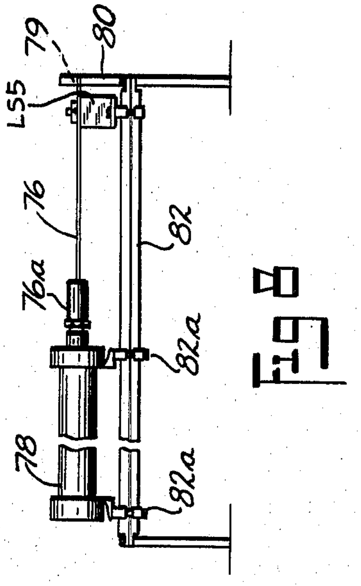
FIG. 8 is a side elevational view of the clean out station of the apparatus of FIG. 1, taken generally along the plane of line 8—8 of FIG. 1, looking in the direction of the arrows.

From bore forming station 22, the rotary table 15 indexes to the clean out station 24 where it automatically stops. Clean out station 24 comprises a ram rod member 76 (FIG. 8) having approximately the same cross sectional size as the area of the bore or hole formed in the candle body B. The rod is coupled as by means of a chuck 76a to a fluid powered, double acting, reciprocal, motor unit 78 which upon actuation thereof extends the rod 76 from its initial starting position, with the distal end thereof disposed in an opening 79 in the associated face plate 80 (FIG. 8) through the face plate and into the bore in the confronting candle body, to clean the bore of any remaining wax chips therein. After a predetermined length of stroke, the motor unit 78 automatically retracts due to actuation of a limit switch, as will be hereinafter described to withdraw the rod from the entire candle body and back to the position illustrated in FIG. 8. The motor unit 78 in the embodiment illustrated, is mounted on rail supports 82, and as by means of threaded fasteners 82a, and may be selectively adjusted lengthwise of the rails, toward and away from the associated candle support 16–16e.

In the interests of smoothing out the bore through the candle body, in the embodiment illustrated there is provided an electric radiant heater 84 which overlies the rod 76 and heats the latter by convection and radiation. Thus, the walls of the bore through the candle are more smoothly formed upon withdrawal of the rod from the bore, aiding in preventing interference with the wicking that is adapted to be subsequently applied through the bore.

Upon retraction of the ram rod at the clean out station 24, the table 15 automatically indexes and presents the clean out candle body in confronting relation to the feed station 26, whereupon the rotary feed table automatically stops.

In conjunction with the feed station 26, there is provided a wicking preparation or conditioning apparatus 86 (FIGS. 1 and 7) which includes a tank 88 which is preferably electrically heated (as at 88a) and thermostatically controlled. Wax W (FIG. 7) is provided in the tank, with the wax being maintained in a liquid condition by the aforementioned heating means 88a associated with the tank.

Figure 7:
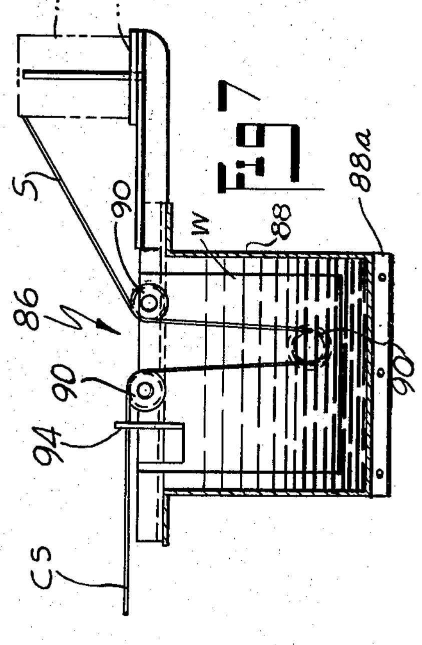
FIG. 7 is a sectional illustration of the preparation station which includes a tank for molten wax, and which is adapted for coating the wicking with a wax, and is taken generally along the plane of line 7—7 of FIG. 1.

The tank, in the embodiment illustrated, includes idler pulleys 90 which are V-grooved on their exterior peripheries, and about which the strand S of wicking material is adapted to pass, as illustrated in FIG. 7, from a spool 91 of the wicking material, which is mounted on a rotary table 92 for rotation as the wicking is pulled therefrom by the feed station, as will be hereinafter described. The strand material may be any suitable wicking material, such as cotton, well known in the candle art.

As the wicking passes about the idler pulleys 90, the wicking is coated with wax, and then passes through a smoothing passage or opening in bracket 94, which smooths the wax on the exterior of the wicking, to aid in its passage through the formed bore in the respective candle blank. As can be seen, such smoothing of the wax occurs over the tank so that any wax scraped off the coated wicking, drops back into the tank where it is recombined with the liquid wax.

Figure 2:
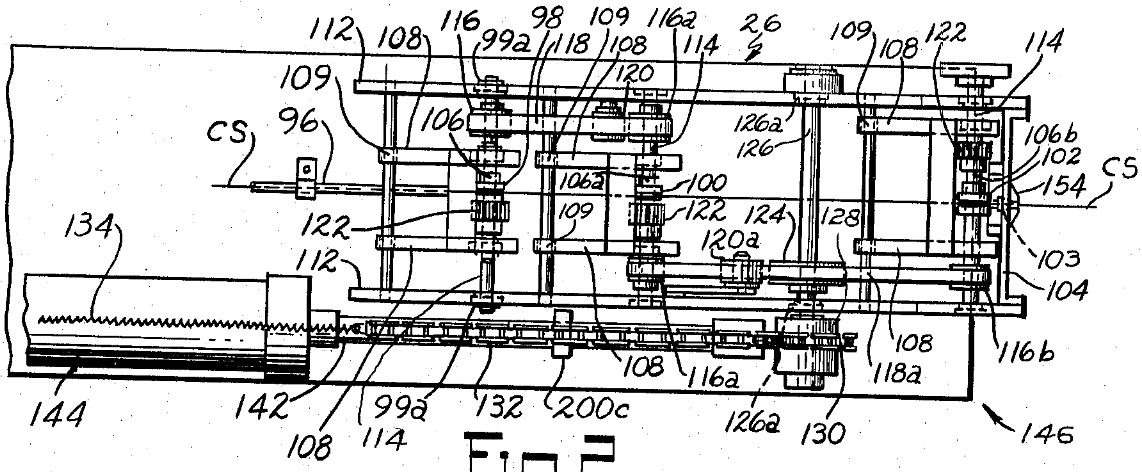
FIG. 2 is a fragmentary, enlarged, top plan view of the feed station of the apparatus illustrated in FIG. 1 with the cutting means associated therewith eliminated.
Figure 3:
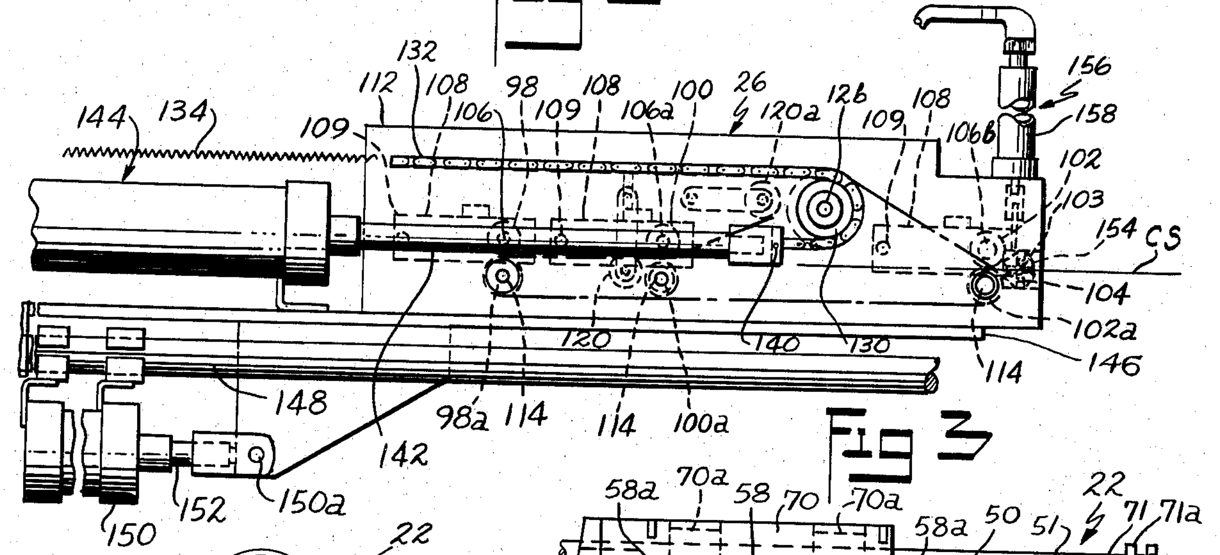
FIG. 3 is a side elevational view of the feed station illustrated in FIGS. 1 and 2, including the aforementioned cutting means, and is taken generally along the plane of line 3—3 of FIG. 1 looking in the direction of the arrows.

The coated wicking strand CS which is rigidified by the congealed wax coating then passes through an elongated tubular member 96 (FIGS. 1 and 2) at the feed station 26, from whence it is directed between the grooved, driven, guide and gripping rollers 98, 98a, which are vertically oriented relative to one another (FIG. 3). From rollers 98, 98a the coated wicking is driven through coacting peripherally grooved guide and gripping rollers 100, 100a, and then through forward, peripherally grooved, guide and gripping rollers 102, 102a, and thence through orifice 103 in facial plate 104, for movement into the bore of a confronting candle body.

Aforementioned drive rollers 98, 100, and 102 are secured to a respective rotatable shaft 106, 106a, 106b, which are mounted on arms 108 pivoted as at 109 to cross supports which in turn are mounted on side plates 112 of the feed station frame.

Likewise, drive rollers 98a, 100a, and 102a are secured to a respective cross shaft 114 rotatably mounted on side plates 112 of the feed station. Same size pulleys 116, 116a and 116b are secured to the respective shaft 114, and are interconnected by means of drive belts 118, 118a. Pivotal slack adjusting pulleys 120, 120a coact with the respective belt 118, 118a to automatically adjust the slack in the latter. The pairs of vertically oriented, rotatable shafts 106 and 114; 106a and 114 and 106b and 114 each have a gear 122 secured thereto for correlating the rotation of the respective pairs of shafts. Aforementioned drive belt 118a coacts in driving relation with pulley 124 secured to cross shaft 126, which in turn is rotatably mounted by bearing means 126a on the side plates 112 of the feed station. A oneway clutch 128 (FIG. 2) is coupled to the shaft 126 which is adapted for rotary actuation by means of sprocket 130, in one direction of rotation (clockwise) of the sprocket.

Sprocket 130 coacts with a chain 132 which in turn is coupled at one end thereof to a spring 134 anchored as at 136 to bracket 138 (FIG. 1), and at the other end thereof is secured as at 140 (FIG. 3) to the piston rod 142 of fluid powered, reciprocal, double acting motor unit 144.

It will be seen that upon retraction of the piston rod from the position illustrated in FIG. 3, the chain causes rotation of the sprocket 130 which is coupled by means of the oneway clutch 128 to the shaft 126, thus causing rotation of pulley 124 and driving of the belt 118a and thus driving of the pulleys 116, 116a and 116b, thus rotating shafts 114, resulting in simultaneous and identical rotation of the drive rollers 98, 98a, 100, 100a and 102, 102a. Accordingly, the linear movement of the piston rod of motor unit 144 is translated into rotary movement for the drive rollers.

Upon extension of the piston rod 142 back to the FIG. 3 position, the sprocket 130 is rotated, but due to the fact that oneway clutch 128 is not actuated in such counterclockwise direction, no rotation of the pairs of drive rollers 98, 98a, 100, 100a and 102, 102a occurs. It will be seen therefore that rotation of the drive rollers and advancement of the strand CS of coated wicking material is in direct proportion to the distance that the piston rod 142 of the motor unit 144 moves.

Advancement of the strand CS of material a predetermined amount as controlled by the stroke of the motor unit 144 will of course extend the coated strand through the aperture 103 and into the bore previously formed in a confronting candle blank. In this connection, the feed station mechanism including the drive for the coated strand and the fluid powered motor actuator 144, is mounted on a platform support 146 which in turn is supported for sliding movement on spaced rails 148 (FIGS. 1 and 3). A double acting, reciprocal fluid powered motor unit 150 is mounted or suspended from the rails 148 and the piston rod 152 thereof is coupled to the platform support 146 and as at 150*a*. Extension of the piston rod 152 causes the whole mechanism including the platform support 146 to be shifted forwardly, so that the conical-like projection 154 on the face plate 104 of the feed mechanism (FIG. 2) is placed into engagement with the confronting end of the candle body into which the wick is to be fed, and in alignment with the bore 153 through the candle blank. The wick is fed into the candle due to the aforedescribed actuation of the actuating motor unit 144, which pulls the wick from the spool, causing it to be coated and generally rigidified at wax apparatus 86, and drives it through opening 103 in the centering projection 154 and into the candle body. In this connection, the wicking is freely received thru the candle blank bore, but some frictional coaction exists to prevent free disassociation of the wick and candle upon handling of the latter.

Figure 10:
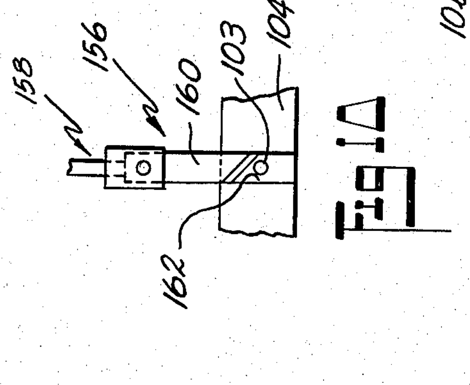
FIG. 10 is a fragmentary elevational view of the cutting means at the feed station for severing a measured amount of wicking from the supply thereof, after insertion of the wicking into the candle blank.

Associated with the feed station is a cutter means 156 (FIGS. 1, 3 and 10) which includes a reciprocal single acting, spring return air motor unit 158 controlled by a solenoid valve as will be hereinafter described in connection with the control diagram of the mechanism. A cutter blade 160 is detachably secured to the motor unit, and is adapted upon actuation to slide in the slot 162 past opening 103 through which the coated wicking extends, to sever the latter. Upon deenergization of the solenoid valve controlling motor unit 158, the knife blade is raised back to the FIG. 10 position by a spring coacting with the piston of the motor unit 158, thereby readying the blade for the next feeding and cutting operation on the strand.

After the knife blade 160 is actuated and deactuated to cut the wick, the whole feeding station 26 supported on platform 146 is withdrawn upon retraction of the piston rod 152 of the motor unit 150, thereby moving the feeding station rearwardly away from the confronting candle body, and leaving the predetermined amount of severed wicking 164 (FIG. 17) extending through the bore in the associated candle. Thereupon the rotary table 15 automatically indexes and moves the candle C with the assembled wicking to the next station where the table automatically stops. A workman can then manually remove the candle from its associated support, or some other mechanism (not shown) could likewise be utilized to remove the candle off into a container or the like for further handling. p Generally such further handling will include the evening off of the candle bottom end to maintain the same general height for all the candles produced on the machine. This "evening off" may be accomplished by heat or by mechanical cutting or planning. The pasting of a seal such as a pressure sensitive paper seal 166 (FIG. 17) over the concaved bottom of the candle may then be accomplished, the bottom being the concaved surface of the candle due to the shrinkage of the wax in the molds during formation of the candle blanks (FIG. 16). It will be seen that the wick in the candle has a tail portion 164*a* which is bent over into the concavity 168 during the aforementioned "evening" of the candle bottom. Also, the cutting mechanism 158 is spaced adequately rearwardly from the forwardmost end of projection 154, so that a predetermined length of the wicking projects upwardly from the generally flat top end surface 170 of the candle body.

The table 15 then automatically indexes to present the candle support trough back once more to loading station position 18, where the process aforedescribed is again repeated.

Referring now in particular to FIGS. 11, 12 and 15, it will be seen that there is provided fluid actuated reciprocal holder means 172 at each station, adapted to hold the candle blanks B in position on their respective support members 16–16*e*, with such holder means comprising a plunger 174 having a head 176 thereon comprised of some relatively soft material (such as rubber), so as to not injure the candle body when the plunger comes down and engages the candle in holding relation. The holding means may be supported in overlying relation to the respective support 16–16*e* by a bracket 178. The purpose of the holder means is to retain the candle blank in position on its support cradle during the various operations thereon. Accordingly, at the loading station 18 on the rotary table, the plunger of the holding means associated with support 16 is in raised condition. However, when the table indexes to intermediate station 20, preparatory to moving to the bore forming station 22, the plunger 174 is actuated downwardly to cause the candle blank to be positively held in position on its support cradle. Such downward position of the respective plunger is maintained until the support for the respective candle rotates away from the feeding station 26 to unloading station 28, whereupon the plunger is automatically raised so that the candle with the installed wicking (C) can be removed from its cradle support for further handling. The holding plungers 174 are automatically actuated by means of, for instance, valves 180 (FIGS. 11, 12 and 15) which include depending reciprocal actuators 180*a*, 180*b*, offset with respect to one another from the vertical axis of rotation 17 of table 15, for controlling movement of the respective plunger 174 by engagement with associated cams (e.g. 182—FIG. 15) spaced about the rotary table 15. The valves 180 controlling their respective plungers can be provided with pressurized fluid (e.g. air) from the common centerpost of the rotary table, and as best illustrated in FIG. 11.

Figure 19:
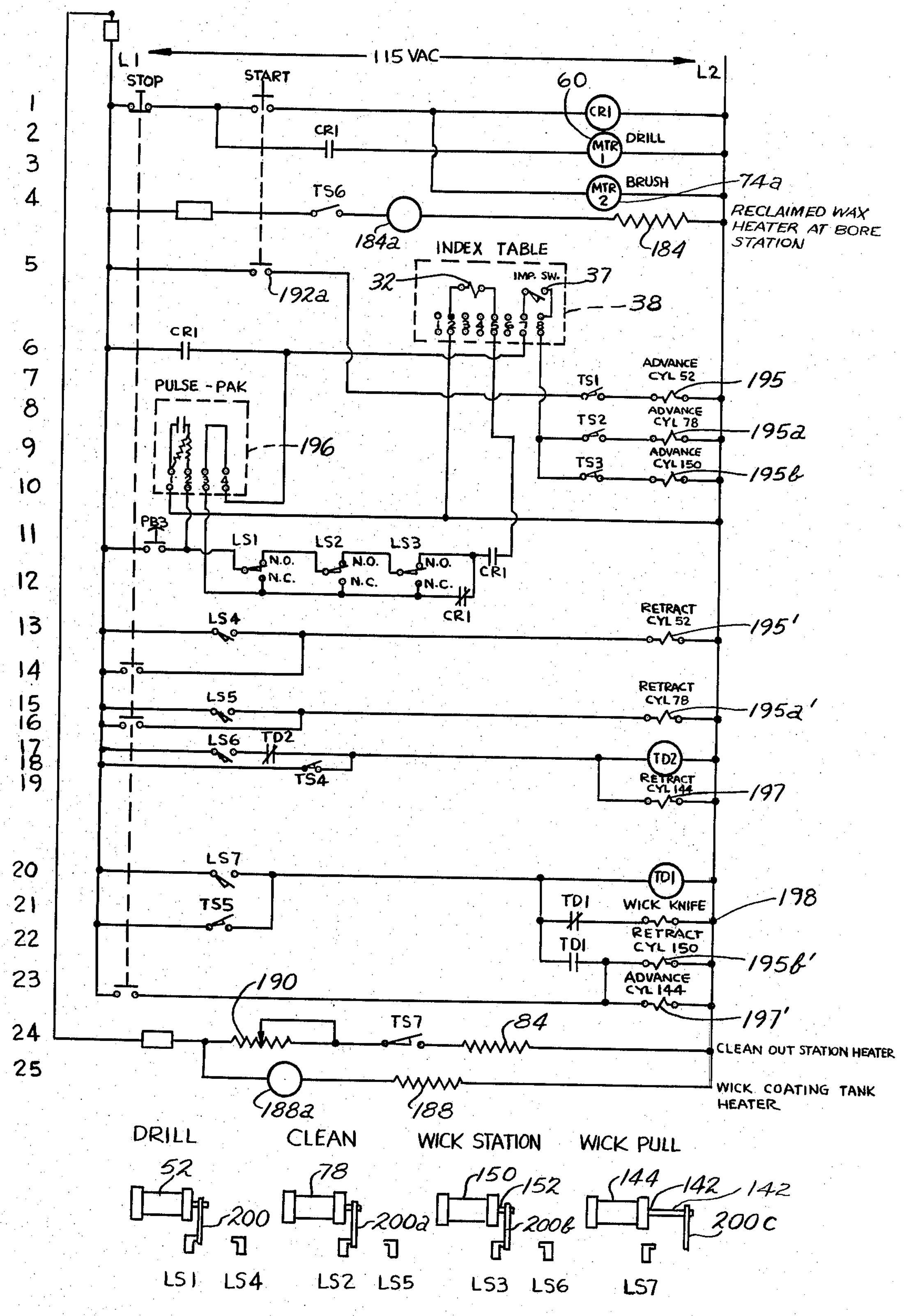
FIG. 19 is a schematic illustration of electrical control circuitry for controlling automatic operation of the apparatus of FIG. 1.

The operation of the apparatus may be generally as follows:

The operator may close switch TS6 which turns on the heater 184 (as controlled by thermostat 184*a*) (FIG. 19) for melting reclaimed wax collected in trough 73 (FIG.1) underlying the drill at the bore forming station 22. The heater 188 for maintaining the wax liquid in wick coating tank 88 (FIG. 7) is automatically controlled by preferably adjustable thermostat 188*a* (FIG. 19—line 25). Switch TS7 and rheostat 190 (FIG. 19—line 24) control heater 84 (FIG. 1) which heats the rod 76 at the clean out station 24, as previously described.

The operator then may push the start button 192 (FIGS. 14 and 19) which closes the circuit in line 1 (FIG. 19) thus energizing relay CR1 and causing closing of the contacts CR1 in line 2 of the control circuit. Upon closure of start button 192 the electric motor 60 for the drill 50, and the electric motor 74*a* for the brush 74, likewise are energized causing the drill bit to rotate, and the brush to likewise rotate.

Index pushbutton PB3 (FIG. 19—line 11) is closed to initiate rotation or indexing of the rotary table 15 in the conventional manner with the signal from the "pulse-pak" being provided to the index table switching console 38 as illustrated in FIGS. 13 and 19. The table automatically indexes moving the candle body which was placed on the support 16 at loading station 18 to the next position or station 20. It will be see that when the start button 192 is closed, the switch contact 192*a* in line 5 of the control circuit is likewise closed.

Toggle or throw switches TS1, TS2 and TS3 in lines 7, 8 and 9 respectively, of the control circuit (FIG. 19) and which are physically found for instance on the control panel 194 (FIG. 14) are manually closed so that the solenoid valves 195, 195*a* and 195*b* which control respectively the fluid powered cylinders 52, 78 and 150, will be energized to cause simultaneous extension of cylinders or motor units 52, 78 and 150. It will be seen from FIG. 19 that in their respective retracted condition of the fluid powered motor units 52, 78 and 150, limit switches LS1, LS2 and LS3 (line 11) are held closed and that normally open contact CR1 in line 11 of the control circuit is closed due to aforementioned energization of relay CR1, thus causing automatic indexing of the rotary table. In this connection, the pulse pak unit 196 is a commercially available item obtainable from the Bellows International of Akron, Ohio, and maintains a momentarily impulse of electrical energy through the index table circuit. The table circuit includes built-in impulse switch 37 (FIGS. 13 and 19) which is tripped as the table completes each of its index steps, and is locked into position. This impulse switch as aforedescribed is tripped by a oneway dog which trips plunger 36. Upon tripping of impulse switch 37 the electrical valves 195, 195*a* and 195*b* controlling respectively the motor units 52, 78 and 150 are actuated so as to supply pressurized fluid to the respective motor cylinder, and cause extension of the piston rod thereof.

Accordingly, the drill or bore forming platform support 70 (FIG. 5) at station 22 is moved forwardly, to cause a drilling operation on a confronting candle body, the clean out ram rod 76 at station 24 is moved forwardly, to clean out the through bore in a confronting candle body, and the feed station platform support 146 is moved forwardly, to place the centering projection 154 on the faceplate 104 into aligned engagement with the confronting bore end in the associated candle body. It will be seen that the mechanism at all three stations 22, 24 and 26, as above described, are actuated substantially simultaneously. It will be seen that during these operations on a respective confronting candle body, the latter is held in position on its respective support (e.g. 16) by the air or fluid actuated retainer or holder plunger 174 (FIG. 12) associated with each support.

Extension of the piston rod of drill station motor unit 52 causes the rotating drill bit to form or drill a generally axial opening in the confronting candle body B. When the piston rod of motor unit 52 reaches its fully extended position, which is adequate so that the drill bit extends completely through the body of the candle, the extended piston rod bracket 200 (FIG. 18) engages limit switch LS4 (line 13—FIG. 19) to cause closing of such switch, and therefore energize the coil 195′ of the control solenoid valve to cause initiation of retraction of the piston rod of fluid actuated motor unit 52, thus causing withdrawal of the drill back to its starting position, the latter being illustrated, for instance, in FIG. 5. Withdrawing or retraction of the piston rod from fully extended condition opens switch LS4 to deactivate the control coil 195′ of the valve.

Likewise, it will be seen that upon advancement of the piston rod of motor unit 78 of the clean out station 24, to a predetermined point, which is adequate to cause the ram rod 76 to pass completely through the bore in the confronting candle body, the limit switch LS5 (line 15—FIG. 19) is actuated by the bracket on the extended piston rod, to cause energization of the coil 195*a*′ of the control valve controlling motor unit 78, which applies fluid pressure to the cylinder of unit 78 in a manner to cause retraction of the piston rod. Retraction of the piston rod causes the limit switch LS5 to automatically open, therefore deenergizing coil 195*a*′ of the associated control valve.

As the piston rod of motor unit 150 extends, it will be seen that normally open contact LS3 (line 11—FIG. 19) of limit switch LS3 opens, and when the piston rod of the cylinder is extended a predetermined amount, limit switch contact LS6 (FIG. 19—line 17) is closed by the bracket on the extended piston rod, causing energization of time delay relay TD2 (line 17), as well as energization of the coil of control valve 197 controlling the "wick pull" motor unit 144, thereby causing retraction of the piston rod thereof and causing advancement of the wax coated, generally rigid wicking through the confronting bore or opening 153 in the candle body. After a predetermined time delay, contacts TD2 in line 17 to open to deenergize the coil of the control valve 197.

When the piston rod of cylinder 144 is retracted a predetermined amount from the FIG. 3 position, normally open limit switch contact LS7 (line 20) is closed by the bracket 200*c* associated with the rod of unit 144, which causes energization of time delay relay TD1 and energization of the coil for control valve 198 controlling the wicking cutter 156, thus causing the latter to cut off the wicking extending through the candle body from the remainder. After a predetermined time delay, opening of normally closed contacts TD1 in line 21 and closing of normally open contacts TD1 in line 22 occurs. Closing of contacts TD1 in line 22 causes retraction of piston rod 152 of motor unit 150 to move the whole feeding station 26 rearwardly away from the confronting candle body. Meanwhile, the control valve 198 controlling the fluid powered motor cylinder 158 for the cutting knife 156 is deactuated (upon opening of contact TD1 in line 21) to cause the knife to be retracted back to inactive position, ready for the next cutting operation. When normally open contact TD1 in line 22 is closed as above described, the coil 197′ (line 23—FIG. 19) of the control valve for motor unit 144 is energized to cause extension of the piston rod thereof back to the FIG. 3 position, thereby causing limit switch contact LS7 in line 20—FIG. 19, to open.

During the advancing of the piston rod of motor unit 144, the one way clutch 128 prevents any rotary movement of the drive rollers 98, 98*a*, 100, 100*a* and 102, 102*a*, and therefore no movement of the wicking strand occurs. As the piston rod moves outwardly from its retracted condition and limit switch LS7 (line 20) drops out, relay TD1 in line 20 (FIG. 19) is deenergized, causing contact TD1 in line 21 to close and contact TD1 in line 22 to open.

It will be seen that when switch PB3 is closed, the pulse pak unit 196 continuously causes indexing of the rotary table, and formation of the opening in the candle body, cleaning of such opening, and insertion of the wick through such opening in the manner aforedescribed continuously occurs. A workman standing at unloading station 28 can remove the candles with the wicks inserted therethrough from the respective support, for further handling, the holder means 172 at station 28 having been automatically deactuated by the cam actuated valve actuators 180*a*, 180*b*.

Adjustment of the limit switch actuating bracket 200*c* relative to its mounting piston rod 142, will vary the stroke of motor unit 144, and in conjunction with adjustably positioning the stops 48 in the respective support 16–16*e*, provides for accommodating different lengths of candle blanks on the apparatus.

From the foregoing description and accompanying drawings it will be seen that the invention provides a novel apparatus and method for installing wicking in a candle body, such as for instance a pillar candle, with the preferred form of the apparatus comprising a bore forming station, a clean out station, and a feeding station for the wicking, together with conveying means for automatically moving a candle body from one station to the next station in the process of inserting a wick therein. The invention also provides a novel pillar candle including a generally axially formed or drilled opening therein extending completely therethrough, together with a waxed wick extending completely through the opening and projecting from both ends thereof, and with one end of the inserted wick being bent into a concavity found at one end of the body, and aiding in retaining the wick positioned in the drilled opening and relative to the candle body.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. An apparatus for automatically installing wicking in a candle body, comprising, a movable support for a candle body, a bore forming station for forming a generally axial opening in an associated candle body when mounted on said support, a clean-out station including a reciprocable heated member for cleaning out the opening formed in the candle body, a feed station for moving a generally rigidified strand of wicking through the formed opening in the candle body, said clean-out station being disposed intermediate said forming station and said feed station for cleaning out the opening formed in the candle body prior to movement of the latter to said feed station, said feed station including cutting means for sequentially severing a measured amount of wicking supplied at said feed station, and means for automatically moving said candle body support from said forming station to and from said cleaning station and thence to said feed station.

2. An apparatus in accordance with claim 1 including a generally horizontally oriented rotary table adapted for rotation about a generally vertical axis and comprising said means for moving said support to and from said stations, and including control means for indexing said rotary table in predetermined increments to sequentially position said candle body support in aligned relation with respective of said stations.

3. An apparatus for automatically installing wicking in a candle body comprising, a movable support for the candle body, a bore forming station for forming a generally axial opening in the candle body, a clean-out station for cleaning out the opening in the candle body, said clean-out station including a reciprocal member and means for heating said member for facilitating relatively close fit movement of said member through the opening in the associated candle body and smoothing of the defining wall of the opening, a feed station, for moving a generally rigidified strand of wicking through the cleaned out opening in the candle body, said feed station including cutting means for sequentially severing a measured amount of wicking supplied thereto at said feed station, and means for automatically moving said support sequentially from said forming station to and from said cleaning station and thence to said feed station.

4. An apparatus in accordance with claim 3 including a wick preparation station coacting with said feed station for initially processing an elongated strand of wicking preparatory to movement thereof to said feed station.

5. An apparatus in accordance with claim 4 wherein said preparation station includes means for prewaxing the elongated strand of wicking in a manner to generally rigidify the latter.

6. An apparatus in accordance with claim 3 wherein said stations include power means comprising air motor units, for accomplishing said bore forming, said clean out, and said wick feeding operations, said means for moving said support including a rotary platform with said power means being disposed generally about the periphery of said platform.

7. An apparatus in accordance with claim 3 wherein said bore forming station comprises a rotatable drill, means for rotating said drill and means for moving it linearly toward and away from said support for a candle body, and means for cleaning the drill as it is retracted away from said candle body support.

8. An apparatus in accordance with claim 3 wherein said feed station comprises a generally linearly shiftable platform movable toward and away from said candle body support to respectively a forward position in coacting relation to said candle body support and to a rearward position with respect to said candle body support, drive means mounted on said platform and adapted for gripping the wicking and moving it linearly toward the opening in an associated candle body when said platform is in said forward position, and means for deactuating the wicking gripping means relative to the wicking during movement of said platform to said rearward position.

9. An apparatus in accordance with claim 3 including control means having stop and start actuators and an indexing means thereon, and means for selectively actuating and deactuating said bore forming station, said clean out station, and said wicking feed station.

10. An apparatus in accordance with claim 3 wherein said reciprocal member of said clean out station comprises a plunger rod, means mounting said plunger rod for generally linear movement toward and away from said support, power means coupled to said plunger rod and adapted for moving said plunger rod linearly toward and away from said support, control circuit means for controlling the movement of said plunger rod toward and away from said support, said heater means heating said plunger rod prior to its movement toward said support.

11. An apparatus in accordance with claim 3 wherein said feed station comprises a reciprocal support including a reciprocal double acting fluid powered motor unit mounted thereon, a rachet clutch mounted on the last mentioned support, the piston rod of said motor unit being coupled to said clutch for causing rotation thereof, said clutch being operative in only one rotary direction for causing movement of an associated shaft coupled to said clutch, and feed means on said last mentioned support coupled to said shaft and adapted to feed the wicking in a direction toward one end of said last mentioned support upon rotation of said clutch in said operative rotary direction, and other power means for moving said last mentioned support and associated feed station mechanism toward and away from said candle body support.

12. An apparatus in accordance with claim 3 including a preparation station for prewaxing and generally rigidifying the wicking prior to its being moved to said feed station, said preparation station including a tank, heating means for maintaining the tank at predetermined temperature for melting wax placed in the tank, and means coacting with the tank for directing the strand of wicking material from a source of supply through the tank so that it will become in contact with molten wax and then will be separated from such contact to permit general solidification of the wax on the strand prior to the strand arriving at said feed station.

13. An apparatus in accordance with claim 12 including means for scraping excess wax from the wicking material.

14. An apparatus in accordance with claim 1 including abutment means coacting with said support adapted for positioning a candle body in predetermined relation on said support, and means for selectively adjusting said abutment means.

15. An apparatus in accordance with claim 1 wherein said support comprises a semi-circular in transverse vertical section trough surface having a groove through the central portion thereof, and stop means mounted in said groove, adapted for abutting relation with one end of an associated candle body, and means for selectively positioning said stop means along said groove whereby different lengths of candles can be handled by said apparatus.

16. An apparatus in accordance with claim 2 including holding means coacting with said support for holding a candle body on the support said holding means including other control means for automatically actuating and deactuating said holding means responsive to which of said stations said support is disposed at.

17. An apparatus in accordance with claim 16 wherein said other control means includes valve actuators mounted on said table for actuating a control valve and cam means disposed exteriorly of said table for actuating coaction with said actuators upon rotation of said table.

18. An apparatus in accordance with claim 14 including means for varying the length of wicking applied to an associated candle body at said feed station and in accordance with the length of the candle body.

* * * * *